US011528595B2

(12) United States Patent
Tsai (10) Patent No.: US 11,528,595 B2
(45) Date of Patent: Dec. 13, 2022

(54) UE CAPABILITY SIGNALING TO SUPPORT 5G NEW RADIO (NR) IN UNLICENSED SPECTRUM (NR-U)

(71) Applicant: MEDIATEK INC., Hsin-Chu (TW)

(72) Inventor: Chiou-Wei Tsai, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 18 days.

(21) Appl. No.: 17/148,135

(22) Filed: Jan. 13, 2021

(65) Prior Publication Data
US 2021/0250752 A1   Aug. 12, 2021

Related U.S. Application Data

(60) Provisional application No. 63/014,813, filed on Apr. 24, 2020, provisional application No. 62/970,791, filed on Feb. 6, 2020.

(51) Int. Cl.
| | |
|---|---|
| *H04W 8/20* | (2009.01) |
| *H04W 36/00* | (2009.01) |
| *H04W 72/04* | (2009.01) |
| *H04W 48/14* | (2009.01) |

(52) U.S. Cl.
CPC ....... *H04W 8/205* (2013.01); *H04W 36/0066* (2013.01); *H04W 48/14* (2013.01); *H04W 72/048* (2013.01)

(58) Field of Classification Search
CPC ......... H04W 36/0061; H04W 36/0066; H04W 48/12; H04W 48/14; H04W 72/048; H04W 8/205; H04W 8/24; H04W 48/08; H04W 48/10; H04W 48/16; H04W 36/00; H04W 72/04; H04W 8/20; H04W 36/16
See application file for complete search history.

(56) References Cited

U.S. PATENT DOCUMENTS

| | | | |
|---|---|---|---|
| 2018/0220303 A1* | 8/2018 | Futaki | H04W 16/14 |
| 2019/0116489 A1 | 4/2019 | Harada et al. | H04W 8/22 |
| 2020/0137744 A1* | 4/2020 | Shikari | H04L 69/04 |
| 2020/0154475 A1* | 5/2020 | Pao | H04W 72/042 |

(Continued)

FOREIGN PATENT DOCUMENTS

| | | |
|---|---|---|
| EP | 3522393 A1 | 3/2016 |
| WO | WO-2021155838 A1 * | 8/2021 |

OTHER PUBLICATIONS

Search Report and Written Opinion of Taiwan IP office for 110104017, dated Jun. 18, 2021 (8 pages) (no English translation available).

*Primary Examiner* — Nathan S Taylor
(74) *Attorney, Agent, or Firm* — Imperium Patent Works; Zheng Jin (57) ABSTRACT

A method for UE capability signaling to support NR-U is proposed. A UE transfers UE capability information to a mobile communication network, and the UE capability information includes information regarding whether the UE supports system information acquisition on an unlicensed cell. The UE receives configuration from a serving cell of the mobile communication network, and the configuration includes information for system information acquisition of one or more unlicensed cells on a frequency. The UE acquires system information of the one or more unlicensed cells on the frequency and reports the acquired system information to the serving cell, or stores the acquired system information in the UE.

16 Claims, 4 Drawing Sheets

(56) References Cited

U.S. PATENT DOCUMENTS

| | | | |
|---|---|---|---|
| 2020/0322918 A1* | 10/2020 | Shih | H04W 56/001 |
| 2021/0029671 A1* | 1/2021 | Rico Alvarino | H04W 72/10 |
| 2021/0092621 A1* | 3/2021 | Shih | H04W 36/0061 |
| 2021/0127325 A1* | 4/2021 | Shih | H04W 48/12 |
| 2021/0168738 A1* | 6/2021 | Shih | H04W 72/042 |
| 2021/0219322 A1* | 7/2021 | Chin | H04L 1/1893 |
| 2021/0298009 A1* | 9/2021 | Almquist | H04W 16/14 |
| 2021/0345124 A1* | 11/2021 | Myung | H04W 72/1268 |
| 2021/0360390 A1* | 11/2021 | Chun | H04W 8/24 |
| 2022/0007365 A1* | 1/2022 | Jung | H04W 72/042 |
| 2022/0104260 A1* | 3/2022 | Wang | H04W 72/14 |
| 2022/0167423 A1* | 5/2022 | Aldana | H04W 74/004 |

* cited by examiner

UE CAPABILITY SIGNALING TO SUPPORT 5G NEW RADIO (NR) IN UNLICENSED SPECTRUM (NR-U)

CROSS REFERENCE TO RELATED APPLICATIONS

This application claims priority under 35 U.S.C. § 119 from U.S. Provisional Application No. 62/970,791, entitled "Methods for UE capability signaling", filed on Feb. 6, 2020; U.S. Provisional Application No. 63/014,813, entitled "Methods for capability signaling", filed on Apr. 24, 2020, the subject matter of which is incorporated herein by reference.

TECHNICAL FIELD

The disclosed embodiments relate generally to wireless communication, and, more particularly, to method for UE capability signaling to support 5G New Radio (NR) in unlicensed spectrum (NR-U).

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an Evolved Universal Terrestrial Radio Access Network (E-UTRAN) includes a plurality of evolved Node-Bs (eNodeBs or eNBs) communicating with a plurality of mobile stations, referred to as User Equipments (UEs). The $3^{rd}$ Generation Partner Project (3GPP) network normally includes a hybrid of 2G/3G/4G systems. With the optimization of the network design, many improvements have developed over the evolution of various standards. The Next Generation Mobile Net (NGMN) board, has decided to focus the future NGMN activities on defining the end-to-end requirements for 5G New Radio (NR) systems.

In 3GPP release 16 specifications, support for 5G NR operating in unlicensed spectrum is introduced (such feature is also called NR-U) to bring to 5G a variety of options for flexibly utilizing the unlicensed spectrum. NR-U supports both license-assisted and standalone use of unlicensed spectrum. Specifically, standalone NR-U enables 5G to be deployed via small cell deployments and operated by any vertical end user without requiring licensed spectrum. This new feature will allow 5G NR to leverage the 5 GHz global band as well as the 6 GHz band, significantly increasing the spectrum reach of 5G.

Unlike licensed spectrum, any operator can access an unlicensed band as long as it follows regulation. Since there is no coordination among operators, two cells deployed by two different operators may be coincidently assigned with the same physical cell ID. Hence, network may need UE's assistance to acquire system information of neighboring cells to learn more about the cells deployed on an unlicensed band (also called unlicensed cells). However, according to the current 3GPP specifications and/or requirements in compliance with 5G/NR, network is unaware of the UE's capability information regarding whether the UE supports system information acquisition on an unlicensed cell.

A solution is sought.

SUMMARY

A method for UE capability signaling to support NR-U is proposed. A UE transfers UE capability information to a mobile communication network, wherein the UE capability information comprises information regarding whether the UE supports system information acquisition on an unlicensed cell. The UE receives configuration from a serving cell of the mobile communication network, wherein the configuration comprises information for system information acquisition of one or more unlicensed cells on a frequency. The UE acquires system information of the one or more unlicensed cells on the frequency and reports the acquired system information to the serving cell, or stores the acquired system information in the UE.

In one embodiment, the reporting of the acquired system information to the serving cell is performed in response to the UE being requested by the serving cell for CGI reporting. In another embodiment, the storing of the acquired system information in the UE is performed in response to a handover of the UE from the serving cell to one of the unlicensed cells. In yet another embodiment, the storing of the acquired system information in the UE is performed in response to the UE receiving an indication that the system information of the one or more unlicensed cells on the frequency has changed.

In one example, the UE capability information is set and reported per frequency band. The system information comprises at least one of a Master Information Block (MIB) and a System Information Block type 1 (SIB1). The SIB1 comprises a Cell Global Identity (CGI) comprising at least one of a Public Land Mobile Network Identity (PLMN ID) and a Physical Cell Identity (PCI). The UE capability information comprises a first indicator of whether the UE supports acquiring MIB on an unlicensed cell, a second indicator of whether the UE supports acquiring SIB1 on an unlicensed cell, and a third indicator of whether the UE supports acquisition of CGI information from a neighboring unlicensed cell. The unlicensed cells are New Radio (NR)-based unlicensed neighboring cells, and the serving cell is an NR-based licensed cell.

In another example, the UE receives a UE capability enquiry message from the mobile communication network, and sends a UE capability information message to the mobile communication network in response to receiving the UE capability enquiry message, wherein the UE capability information is transferred via the UE capability information message.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
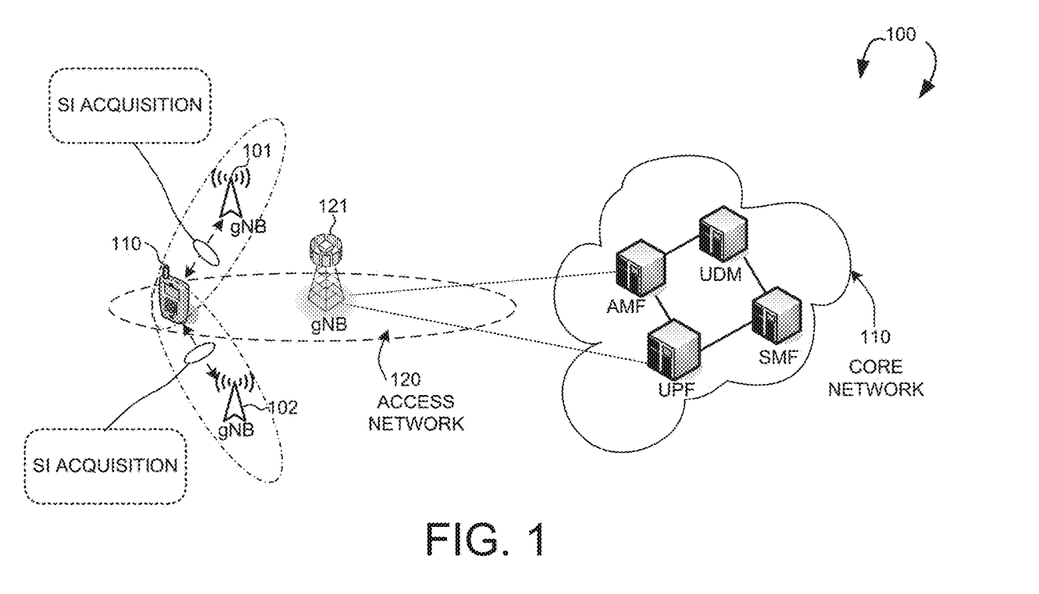
FIG. 1 illustrates an exemplary mobile communication network 100 supporting unlicensed spectrum in accordance with one novel aspect.

FIG. 1 illustrates an exemplary mobile communication network 100 supporting unlicensed spectrum in accordance with one novel aspect. The mobile communication network 100 may be a 5G new radio (NR) network which comprises a user equipment (UE) 110 communicatively connected to a gNB 121 operating in a licensed band (e.g., 30 GHz~300 GHz for mmWave) of an access network 120. The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy.

In addition to the gNB 121, the UE 110 is surrounded by a plurality of gNBs, including the gNBs 101 and 102, which operate in an unlicensed band (e.g., 5 GHz or 6 GHz). Each of the gNBs 101 and 102 may be deployed by the same operator of the gNB 121, or may be deployed by a different operator than the operator of the gNB 121. The gNB 121 may form at least one cell which may be referred to as an NR-based licensed cell (i.e., a cell operating in a 5G NR licensed band). Similarly, each of the gNBs 101 and 102 may form at least one cell which may be referred to as an NR-based unlicensed cell (i.e., a cell operating in an unlicensed band).

The UE 110 may be a smart phone, a wearable device, an Internet of Things (IoT) device, and a tablet, etc., and may or may not support system information acquisition on an unlicensed cell.

In accordance with one novel aspect, if the UE 110 supports system information acquisition on an unlicensed cell and camps on the cell (e.g., a PCell or PSCell) formed by the gNB 121, the UE 110 may transfer its UE capability regarding whether it supports system information acquisition on an unlicensed cell to the serving cell during a UE capability transfer procedure. After that, the gNB 121 may configure the UE 110 to acquire the system information of one or more unlicensed cells on a frequency, and the UE 110 may report the acquired system information to the serving cell or store the acquired system information in the UE 110.

Specifically, the system information includes at least one of a Master Information Block (MIB) and a System Information Block type 1 (SIB1). In particular, the SIB1 includes a Cell Global Identity (CGI) which includes at least one of a Public Land Mobile Network Identity (PLMN ID) and a Physical Cell Identity (PCI). With the CGI included in the reported system information, the mobile communication network 100 may learn more about the unlicensed cells and may solve the problem of two or more unlicensed cells deployed by different operators being coincidently assigned with the same PCI.

To further clarify, in 5G NR, system information may be divided into three categories, including Minimum System Information (MSI) and Other System Information (OSI). The MSI contains the MIB and a Remaining Minimum System Information (RMSI) which includes the SIB1, while the OSI contains the rest SIBs, including SIB2~SIB9.

In one embodiment, the UE 110 may receive the configuration for system information acquisition of one or more neighboring unlicensed cells on a frequency from the serving cell via a radio resource control (RRC) Connection Reconfiguration message, and the UE 110 is requested for Cell Global Identity (CGI) reporting according to the received configuration.

In another embodiment, the UE 110 may receive the configuration for system information acquisition of at least one target unlicensed cell on a frequency from the serving cell via a handover command (e.g., an RRC Connection Reconfiguration message), and the UE 110 is requested to perform a handover from the serving cell to the target unlicensed cell according to the received configuration. Then, the UE 110 acquires the system information of the target cell in response to the handover, and locally stores the acquired system information.

In another embodiment, the UE 110 may receive the configuration for system information acquisition of one or more unlicensed cells on a frequency from the serving cell via a message including an indication that the system information of the one or more unlicensed cells on the frequency has changed, and the UE 110 is requested to perform MIB reading and SIB1 reading according to the received configuration. Then, the UE 110 acquires the new system information, and locally stores the new system information.

Figure 2:
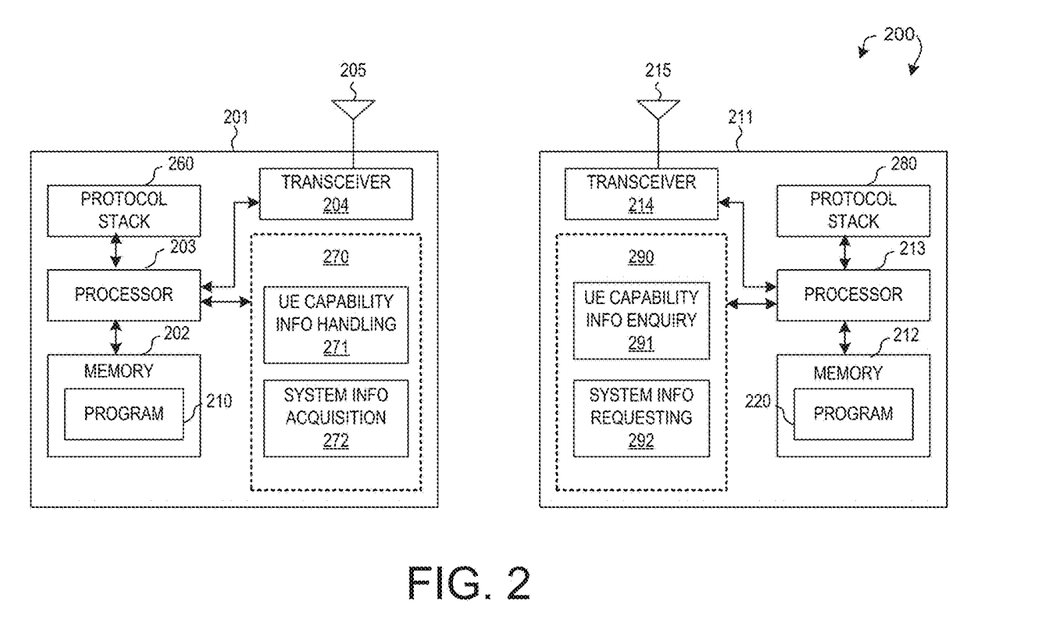
FIG. 2 illustrates simplified block diagrams of wireless devices in accordance with embodiments of the current invention.

FIG. 2 illustrates simplified block diagrams of wireless devices, e.g., a UE 201 and a gNB 211 in accordance with embodiments of the current invention. The gNB 211 has an antenna 215, which transmits and receives radio signals. A radio frequency RF transceiver module 214, coupled with the antenna 215, receives RF signals from the antenna 215, converts them to baseband signals and sends them to the processor 213. The RF transceiver 214 also converts received baseband signals from the processor 213, converts them to RF signals, and sends out to the antenna 215. The processor 213 processes the received baseband signals and invokes different functional modules to perform features in the gNB 211. The memory 212 stores program instructions and data 220 to control the operations of the gNB 211. In the example of FIG. 2, the gNB 211 also includes a protocol stack 280 and a set of control function modules and circuits 290. The protocol stack 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, the control function modules and circuits 290 includes a UE capability information enquiry circuit 291 that enquires the UE capability information of the UE 201, and a system information requesting circuit 292 that prepares the configuration of one or more unlicensed cells for system information acquisition.

Similarly, the UE 201 has a memory 202, a processor 203, and a radio frequency (RF) transceiver module 204. The RF transceiver 204 is coupled with the antenna 205, receives RF signals from the antenna 205, converts them to baseband signals, and sends them to the processor 203. The RF transceiver 204 also converts received baseband signals from the processor 203, converts them to RF signals, and sends out to the antenna 205. The processor 203 processes the received baseband signals and invokes different functional modules and circuits to perform features in the UE 201. The memory 202 stores data and program instructions 210 to be executed by the processor 203 to control the operations of the UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of the UE 201.

The UE 201 also includes a protocol stack 260 and a set of control function modules and circuits 270. The protocol stack 260 includes NAS layer to communicate with an AMF/SMF/MME entity connecting to the core network, RRC layer for high layer configuration and control, PDCP/RLC layer, MAC layer, and PHY layer. The Control function modules and circuits 270 may be implemented and configured by software, firmware, hardware, and/or combination thereof. The control function modules and circuits 270, when executed by the processor 203 via program instructions contained in the memory 202, interwork with each other to allow the UE 201 to perform embodiments and functional tasks and features in the network.

In one example, the control function modules and circuits 270 includes a UE capability information handling circuit 271 that provides the information of the UE capability regarding whether the UE 201 supports system information acquisition on an unlicensed cell, and a system information acquisition circuit 272 that handles the acquired system information of unlicensed cells.

Figure 3:
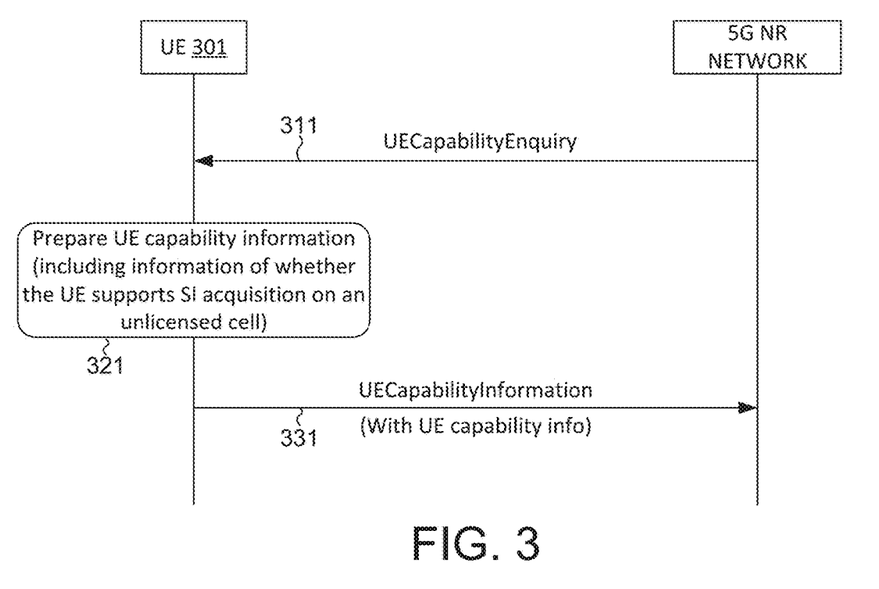
FIG. 3 illustrates a sequence flow between a UE 301 and a 5G NR network for UE capability signaling to support NR-U in accordance with one novel aspect.

FIG. 3 illustrates a sequence flow between a UE 301 and a 5G NR network for UE capability signaling to support NR-U in accordance with one novel aspect. In step 311, the UE 301 receives a UECapabilityEnquiry message from the 5G NR network. The 5G NR network may initiate this procedure to a UE in RRC_CONNECTED when it needs (additional) UE radio access capability information. The 5G NR network should retrieve UE capabilities only after AS security activation. In step 321, the UE 301 prepares the UE capability information including the information of whether the UE 301 supports system information acquisition on an unlicensed cell. Specifically, the UE capability information may include a first indicator (e.g., a "mib-Acquisition-r16" IE) of whether the UE 301 supports acquiring MIB on an unlicensed cell, a second indicator (e.g., a "sib1-Acquisition-r16" IE) of whether the UE 301 supports acquiring SIB1 on an unlicensed cell, and a third indicator (e.g., a "cgi-Acquisition-r16" IE) of whether the UE 301 supports acquisition of CGI information from a neighboring unlicensed cell. In step 331, the UE 301 sends a UECapabilityInformation message including the UE capability information to the 5G NR network.

Figure 4:
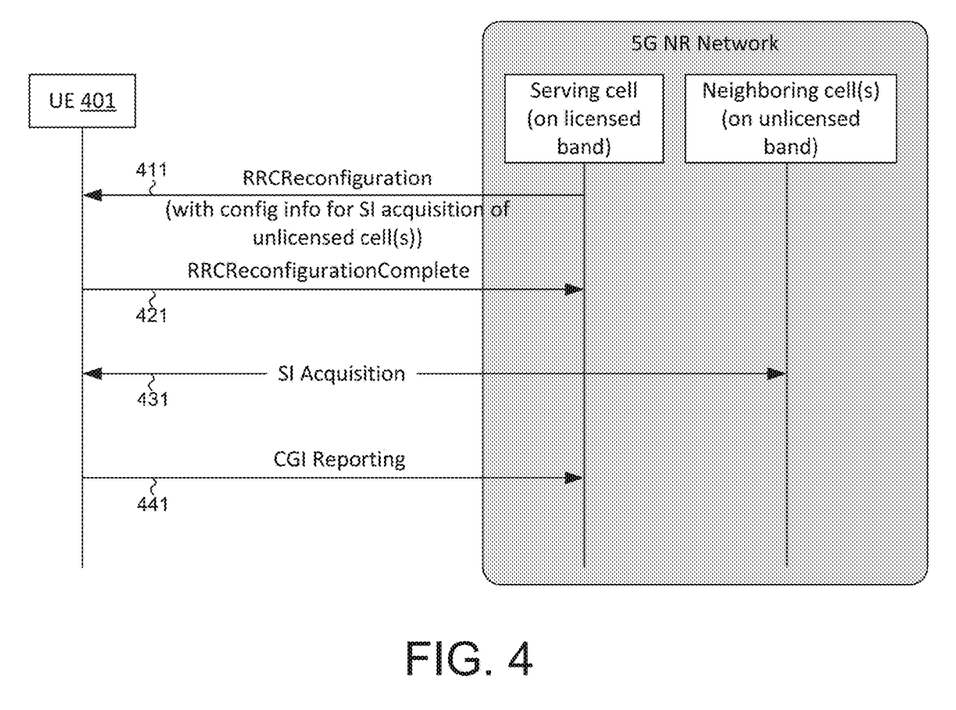
FIG. 4 illustrates a sequence flow between a UE 401 and a 5G NR network for CGI acquisition and reporting in accordance with one novel aspect.

FIG. 4 illustrates a sequence flow between a UE 401 and a 5G NR network for CGI acquisition and reporting in accordance with one novel aspect. In step 411, the UE 401 receives an RRCReconfiguration message with configuration including information for system information acquisition of one or more unlicensed cells on a frequency. In one example, the configuration may be included in a "reportCGI-RequestNR" IE or a "reportCGI-RequestEUTRA" IE specified in 3GPP TS 38.331 (v16.3.1). In step 421, the UE 401 sends an RRCReconfigurationComplete message to the 5G NR network. In step 431, the UE 401 acquires the system information of the unlicensed cells on the frequency. In step 441, the UE 401 reports the acquired system information to the 5G NR network.

To further clarify, the system information acquisition referred to herein aims to read the CGI information which is carried in the SIB1. In order to read the SIB1, UE first needs to read the MIB which carries the Physical Downlink Control Channel (PDCCH) configuration (e.g., the CORESET #0 and Type0-PDCCH configuration) of SIB1. Note that, in NR-U, transmissions are subject to Listen Before Talk (LBT) results. To increase the probability of successful transmission of Synchronization Signal/Physical Broadcast Channel (SS/PBCH) blocks, the concept of discovery burst windows is introduced in NR-U to increase the number of transmission opportunities for a given SS/PBCH block. Hence, UE needs to monitor multiple positions within a discovery burst window for reading the PBCH of a given SS/PBCH block. This complicates the UE's PBCH reading process compared with that in licensed bands.

More specifically, a discovery burst refers to a DL transmission burst including a set of signal(s) and/or channel(s) confined within a window and associated with a duty cycle. The discovery burst can be any of the following: (1) transmission(s) initiated by an eNB that includes a Primary Synchronization Signal (PSS), Secondary Synchronization Signal (SSS) and Cell-specific Reference Signal(s) (CRS) and may include non-zero power CSI Reference Signals (CSI-RS); (2) transmission(s) initiated by a gNB that includes at least an SS/PBCH block consisting of a PSS, SSS, PBCH with associated De-Modulation Reference Signal (DM-RS) and may also include CORESET for PDCCH scheduling PDSCH with SIB1, and PDSCH carrying SIB1 and/or non-zero power CSI-RS.

When SS/PBCH blocks are located in sync-raster, UE determines CORESET #0 frequency location in a way same as in Release 15 (R15) licensed operation. Specifically, UE reads the PBCH in an SS/PBCH block and uses the information ($k_{SSB}$ and SSB-CORESET0 PRB) carried in MIB to determine the frequency offset between the SS/PBCH block and CORESET #0. On the other hand, when an SS/PBCH block is not located in sync-raster, UE has to determine the frequency location of CORESET #0 in a more complicated way. Specifically, for the given frequency of SSB off sync-raster, UE determines which LBT sub-band it is within. Next, UE determines the frequency of SSB on sync-raster for that LBT sub-band. Then, UE reads the PBCH in the SSB off sync-raster and uses the indicated k_SSB and SSB-CORESET0 PRB offset to determine the position of CORESET0 as if the SSB was transmitted on the sync raster point.

Figure 5:
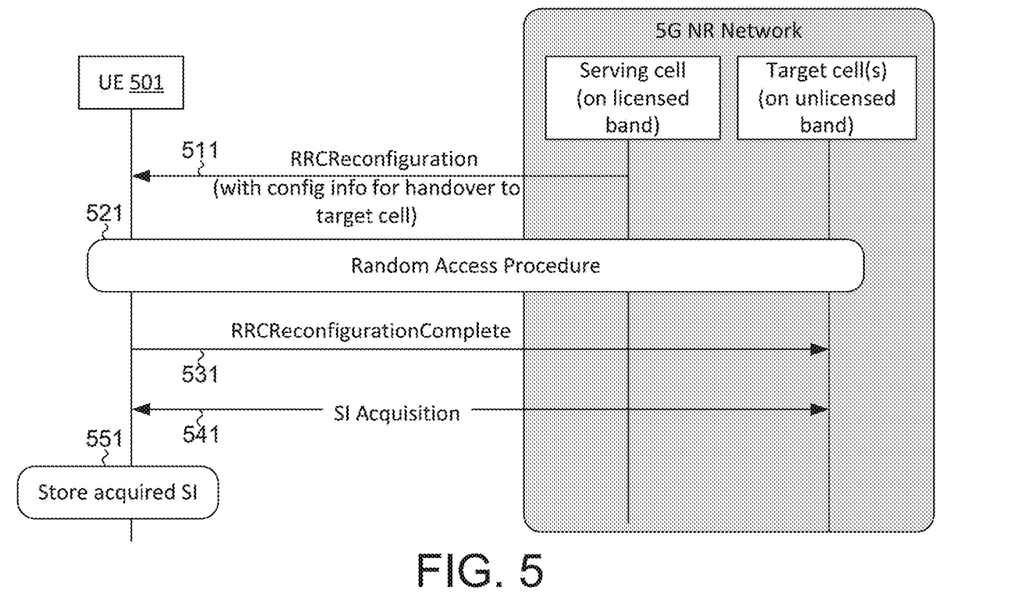
FIG. 5 illustrates a sequence flow between a UE 501 and a 5G NR network for CGI acquisition in accordance with one novel aspect.

FIG. 5 illustrates a sequence flow between a UE 501 and a 5G NR network for CGI acquisition in accordance with one novel aspect. In step 511, the UE 501 receives an RRCReconfiguration message with configuration from the serving cell (i.e., a source cell) on a licensed band, wherein the configuration includes information for a handover of the UE 501 from the serving cell to a target cell on an unlicensed band. In step 521, the UE 501 performs a random access procedure with the target cell. In step 531, the UE 501 sends an RRCReconfigurationComplete message to the target cell upon successful completion of the random access procedure.

In step 541, the UE 501 acquires the system information of the target cell on the unlicensed band. That is, the configuration of the handover information may also be interpreted as configuration for system information acquisition, since the system information acquisition is triggered by the configuration of the handover information. In step 551, the UE 501 locally stores the acquired system information.

In one example, the system information acquisition at least includes SIB1 reading, so that the UE 501 may obtain the CGI from the SIB1 and determine whether the target cell and the source cell belong to the same PLMN. The UE 501 may decide to hand over to the target cell if the target cell and the source cell belong to the same PLMN.

Figure 6:
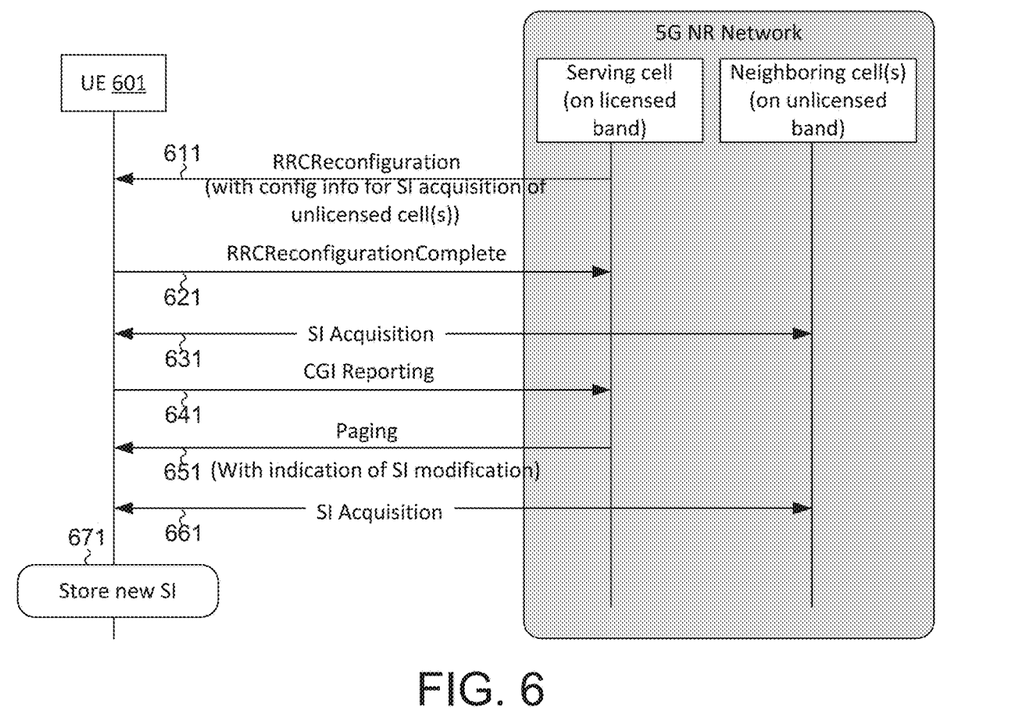
FIG. 6 illustrates a sequence flow between a UE 601 and a 5G NR network for CGI acquisition in accordance with one novel aspect.

FIG. 6 illustrates a sequence flow between a UE 601 and a 5G NR network for CGI acquisition in accordance with one novel aspect. In step 611, the UE 601 receives an RRCReconfiguration message with configuration from the serving cell, wherein the configuration includes information for system information acquisition of one or more unlicensed cells on a frequency. In one example, the serving cell may be a PCell or PSCell. In step 621, the UE 601 sends an RRCReconfigurationComplete message to the serving cell. In step 631, the UE 601 acquires the system information of the unlicensed cells on the frequency. In step 641, the UE 601 reports the acquired system information to the serving cell. In step S651, the UE 601 receives a message from the serving cell, wherein the message includes an indication that the system information of the unlicensed cells on the frequency has changed. In step 661, the UE 601 performs MIB reading and SIB1 reading to acquire the new system information. In step 671, the UE 601 locally stores the new system information.

Figure 7:
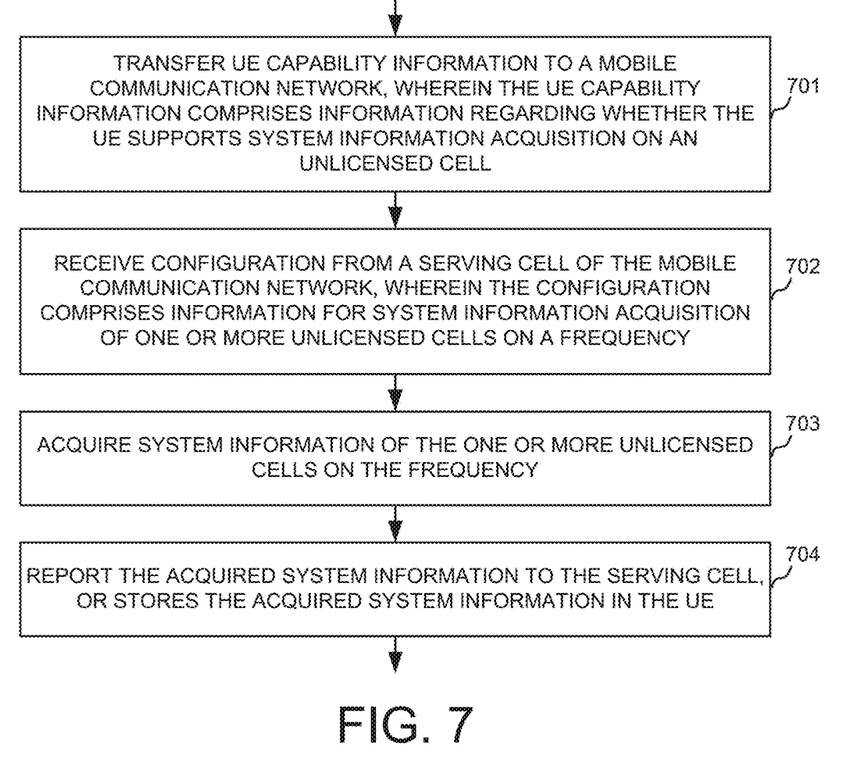
FIG. 7 is a flow chart of a method for UE capability signaling to support NR-U in accordance with one novel aspect.

FIG. 7 is a flow chart of a method for UE capability signaling to support NR-U in accordance with one novel aspect. In step 701, a UE transfers its UE capability information to a mobile communication network, wherein the UE capability information comprises information regarding whether the UE supports system information acquisition on an unlicensed cell. In step 702, the UE receives configuration from a serving cell of the mobile communication network, wherein the configuration comprises information for system information acquisition of one or more unlicensed cells on a frequency. For example, the UE capability information in step 701 may be transferred to the same serving cell as the one from which the configuration in step 702 is received. Alternatively, the UE capability information in step 701 may be transferred to a different serving cell than the one from which the configuration in step 702 is received. In step 703, the UE acquires system information of the one or more unlicensed cells on the frequency. In step 704, the UE reports the acquired system information to the serving cell, or stores the acquired system information in the UE.

In one example, the UE capability information is set and reported per frequency band. In one example, the system information comprises at least one of a MIB and a SIB1, and the SIB1 comprises a CGI comprising at least one of a PLMN ID and a PCI. In one example, the UE capability information comprises a first indicator of whether the UE supports acquiring MIB on an unlicensed cell, a second indicator of whether the UE supports acquiring SIB1 on an unlicensed cell, and a third indicator of whether the UE supports acquisition of CGI information from a neighboring unlicensed cell. In one example, the unlicensed cells are NR-based unlicensed neighboring cells, and the serving cell is an NR-based licensed cell. In one example, the UE receives a UE capability enquiry message from the serving cell, and sends a UE capability information message to the serving cell in response to receiving the UE capability enquiry message, wherein the UE capability information is transferred via the UE capability information message.

In one embodiment, the reporting of the acquired system information to the serving cell is performed in response to the UE being requested by the serving cell for CGI reporting.

In another embodiment, the storing of the acquired system information in the UE is performed in response to a handover of the UE from the serving cell to one of the unlicensed cells.

In another embodiment, the storing of the acquired system information in the UE is performed in response to the UE receiving an indication that the system information of the one or more unlicensed cells on the frequency has changed.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
transferring User Equipment (UE) capability information to a mobile communication network by a UE, wherein the UE capability information comprises a first indicator indicates whether the UE supports acquiring Master Information Block (MIB) on an unlicensed cell, a second indicator indicates whether the UE supports acquiring System Information Block type 1 (SIB1) on the unlicensed cell, and a third indicator indicates whether the UE supports acquisition of Cell Global Identity (CGI) information from a neighboring unlicensed cell;
receiving configuration from a serving cell of the mobile communication network by the UE, wherein the configuration comprises information for system information acquisition of one or more unlicensed cells on a frequency, wherein the unlicensed cells are New Radio (NR)-based unlicensed neighboring cells, and the serving cell is an NR-based licensed cell;
acquiring system information of the one or more unlicensed cells on the frequency by the UE; and
reporting the acquired system information to the serving cell by the UE, or storing the acquired system information in the UE.

2. The method of claim 1, wherein the UE capability information is set and reported per frequency band.

3. The method of claim 1, wherein the system information comprises at least one of a Master Information Block (MIB) and a System Information Block type 1 (SIB1).

4. The method of claim 3, wherein the SIB1 comprises a Cell Global Identity (CGI) comprising at least one of a Public Land Mobile Network Identity (PLMN ID) and a Physical Cell Identity (PCI).

5. The method of claim 1, further comprising:
receiving a UE capability enquiry message from the mobile communication network by the UE; and
sending a UE capability information message to the mobile communication network by the UE in response to receiving the UE capability enquiry message;
wherein the UE capability information is transferred via the UE capability information message.

6. The method of claim 1, wherein the reporting of the acquired system information to the serving cell is performed in response to the UE being requested by the serving cell for CGI reporting.

7. The method of claim 1, wherein the storing of the acquired system information in the UE is performed in response to a handover of the UE from the serving cell to one of the unlicensed cells.

8. The method of claim 1, wherein the storing of the acquired system information in the UE is performed in response to the UE receiving an indication that the system information of the one or more unlicensed cells on the frequency has changed.

9. A User Equipment (UE), comprising:
- a transmitter that transfers UE capability information to a mobile communication network, wherein the UE capability information comprises a first indicator indicates whether the UE supports acquiring Master Information Block (MIB) on an unlicensed cell, a second indicator indicates whether the UE supports acquiring System Information Block type 1 (SIB1) on the unlicensed cell, and a third indicator indicates whether the UE supports acquisition of Cell Global Identity (CGI) information from a neighboring unlicensed cell;
- a receiver that receives configuration from a serving cell of the mobile communication network, wherein the configuration comprises information for system information acquisition of one or more unlicensed cells on a frequency, and the receiver acquires system information of the one or more unlicensed cells on the frequency, wherein the unlicensed cells are New Radio (NR)-based unlicensed neighboring cells, and the serving cell is an NR-based licensed cell; and
- a system information handling circuit that reports the acquired system information to the serving cell, or stores the acquired system information in the UE.

10. The UE of claim 9, wherein the UE capability information is set and reported per frequency band or per frequency band combination.

11. The UE of claim 9, wherein the system information comprises at least one of a Master Information Block (MIB) and a System Information Block type 1 (SIB1).

12. The UE of claim 11, wherein the SIB1 comprises a Cell Global Identity (CGI) comprising at least one of a Public Land Mobile Network Identity (PLMN ID) and a Physical Cell Identity (PCI).

13. The UE of claim 9, wherein the UE receives a UE capability enquiry message from the mobile communication network, and sends a UE capability information message to the mobile communication network in response to receiving the UE capability enquiry message; and wherein the UE capability information is transferred via the UE capability information message.

14. The UE of claim 9, wherein the reporting of the acquired system information to the serving cell is performed in response to the UE being requested by the serving cell for CGI reporting.

15. The UE of claim 9, wherein the storing of the acquired system information in the UE is performed in response to a handover of the UE from the serving cell to one of the unlicensed cells.

16. The UE of claim 9, wherein the storing of the acquired system information in the UE is performed in response to the UE receiving an indication that the system information of the one or more unlicensed cells on the frequency has changed.

* * * * *